US005575502A

United States Patent [19]

Oppitz et al.

[11] Patent Number: 5,575,502
[45] Date of Patent: Nov. 19, 1996

[54] ROTARY ACTUATOR SUCH AS A HYDRAULIC ROTARY ACTUATOR FOR A MOTOR VEHICLE AND A METHOD OF MAKING A ROTARY ACTUATOR

[75] Inventors: Horst Oppitz, Dittelbrunn; Stefan Schiffler, Schonungen; Bernhard Schmitt, Wasserlosen, all of Germany

[73] Assignee: Fichtel & Sachs AG, Schweinfurt, Germany

[21] Appl. No.: 331,042

[22] Filed: Oct. 28, 1994

[30] Foreign Application Priority Data

Nov. 5, 1993 [DE] Germany ............... 43 37 773.4
Oct. 6, 1994 [DE] Germany ............... 44 35 692.7

[51] Int. Cl.⁶ .................................................. B60G 21/00
[52] U.S. Cl. ........................ 280/689; 267/277; 280/723
[58] Field of Search ........................ 280/689, 723, 280/741; 267/277, 276; 403/212, 279, 284

[56] References Cited

FOREIGN PATENT DOCUMENTS

1175563  2/1965  Germany .
1179124  5/1965  Germany .
4229025  3/1994  Germany .
0657873  9/1951  United Kingdom .

*Primary Examiner*—Eric D. Culbreth
*Attorney, Agent, or Firm*—Nils H. Ljungman and Associates

[57] ABSTRACT

A rotary actuator for a divided stabilizer on a vehicle axle is taught. The rotary actuator has a cylinder, the ends of which are closed to form a working space. Ribs run axially on the inside diameter of the cylinder. In addition, vanes from a motor shaft have the same axial extension within the cylinder as the ribs of the cylinder. The vanes of the motor shaft and the ribs of the cylinder divide the working space into individual work chambers. The rotary actuator can also have a first and a second hydraulic connection for two separate work chambers, with an additional hydraulic connection system between at least pairs of work chambers. The orientation of the connected work chambers is such that the work chambers corresponding to the first hydraulic connection alternate with those which are connected to the second hydraulic connection. A first cap can be provided to close the end of the working chamber, and this cap can be fixed in place on the rotary actuator by means of a deformation connection to the cylinder.

7 Claims, 5 Drawing Sheets

ROTARY ACTUATOR SUCH AS A HYDRAULIC ROTARY ACTUATOR FOR A MOTOR VEHICLE AND A METHOD OF MAKING A ROTARY ACTUATOR

BACKGROUND OF THE INVENTION

1. Field of the Invention

The present invention generally relates to a rotary actuator and a method for assembling a rotary actuator. More specifically, the present invention can relate to a hydraulic rotary actuator such as might be used in a motor vehicle suspension, and also to a method for assembling such a hydraulic rotary actuator. Such a rotary actuator in a motor vehicle suspension generally can be a part of a divided stabilizer on an axle of the vehicle. The actuator can essentially be formed by a cylinder, the ends of which would typically be closed to define e working space within the cylinder. The cylinder can have ribs which run axially on the inside diameter of the cylinder, and there can also be a motor shaft with vanes which have essentially the same axial extension as the ribs of the cylinder. The vanes of the motor shaft and the ribs of the cylinder divide the working space into individual work chambers. First and second hydraulic connections can be provided for two separate work chambers, and a connection system can be provided between the work chambers to form a hydraulic connection between at least pairs of work chambers, whereby the orientation of the connected work chambers is such that the work chambers corresponding to the first hydraulic connection alternate with the work chambers which are connected to the second hydraulic connection.

2. Background Information

A general problem with motor vehicles has been a rolling motion which occurs during cornering. Attempts to solve this problem have long employed a divided stabilizer which is connected, at its connecting surfaces, to a rotary actuator. By means of the rotary actuator, the torsion moment in or on the stabilizer can be controlled so that, for example, when the vehicle is travelling straight ahead, the stabilizer does not influence the suspension action at all, or only very little, but during fast cornering, the stabilizer provides a bias to suppress the rolling motion and thus the tendency of the vehicle to tilt to one side.

German Patent Application No. 1 179 124 discloses a rotary actuator for a divided stabilizer. In this rotary actuator, the end caps are bolted to a cylinder to form the working space. This solution, which employs threaded fasteners for a connection between the caps and the cylinder, is not only excessively expensive, but also takes up a great deal of space. There is an extremely small amount of space available inside a stabilizer for the installation of a rotary actuator. For stabilizers on the front axle, the stabilizer frequently runs into a space conflict with parts of the engine, for example, the oil pan, or possibly the radiator. Similar problems often occur on the rear axle as a result of the exhaust system, the trough for the trunk or the spare tire.

The outside diameter of the rotary actuator is not the only dimension which must be taken into consideration to solve the problem of installation space, as the axial length of the component is also important. In known actuators, a major portion of the length is taken up by the connection system between the work cheers of the working space. In Federal Republic of Germany Patent Application 1 179 124, the connection system consists of a series of discs that are located between the working space and one of the end caps. But after a certain surface area of the vanes or ribs inside the rotary actuator has been mathematically specified for a specified moment, the sequence of the connection system takes up an axial length which makes the rotary actuator longer without increasing its moment.

The rotary actuator disclosed in German Patent Application No. 1 175 563 seems at first glance to solve the problem described above. But, with this actuator, there is an additional problem, in that each work chamber has a separate hydraulic connection, i.e. ultimately there is no internal connection system. Each of the separate hydraulic connections represents a potential source of uncertainty with regard to leaks, as the hydraulic lines underneath the vehicle are exposed to the effects of heat, humidity and abrasive substances. In addition, because of the constant motion of the components of the stabilizer, the hydraulics connections can also be subjected to essentially constant movement, which might tend to loosen the connection Joints.

British Patent GB 657 873 discloses a rotary actuator, which comprises a cylinder which is closed on the end and forms a work space, ribs which run axially on the inside diameter of the cylinder, and a motor shaft with vanes which have the same axial length as the ribs of the cylinder. The vanes of the motor shaft and the ribs of the cylinder divide the work space into individual work chambers. In addition, the rotary actuator also has a first and a second hydraulic connection for two separate work cheers, and a connection system between the work chambers which hydraulically connects at least pairs of work chambers, whereby the connected work chambers are connected so that the work chambers corresponding to the first hydraulic connection alternate with those connected to the second hydraulic connection.

While the rotary actuator described herein is described in conjunction with use in a motor vehicle suspension, it should be noted that rotary actuators are used not only in vehicle suspension systems, but are also widely used in industry, whereby the same problems can typically occur as in the application described above.

OBJECT OF THE INVENTION

The object of the present invention is to realize a rotary actuator which is characterized by its small size, can be manufactured economically, and eliminates the disadvantages described above.

The present invention teaches that this object can be achieved by means of an end cap which closes the working space on the end of the cylinder, and is fastened to the rotary actuator preferably by means of a deformation connection. Basically, it has been determined that a deformation connection can essentially eliminate problems with leaks. In addition, since welding has commonly been the method for attaching the end caps, use of a deformation connection can also reduce problems relating to the transmission of heat on the rotary actuator during manufacture of the rotary actuator.

For one advantageous embodiment of the present invention, the deformation connection can be provided as a crimped, or rolled flange on the edge of the cylinder. The crimping of a flange can essentially take place in a very short period of time, and can thereby be very cost effective. The flange, on account of the crimping, provides a qualitative, high-grade surface.

Alternatively, the deformation connection can be provided by means of at least one partial flange, or crimp. This embodiment can be preferable for high-strength, and very difficult to deform materials, wherein a complete cylindrical flange might be difficult to provide. For such materials, the deformations can also be formed by at least one bead, or reinforcing seam. Such a bead could preferably be disposed away from the edge of the cylinder, and thus, an additional overall advantage can be provided, because no projecting length would be needed on the ends of the cylinder, as are generally needed for crimping or flanging. Depending on the requirements of the actuator, it is also feasible that the bead can be constructed as a partial bead, that is, the bead preferably does not completely encircle the cylinder.

While it is conceivable that both end caps could be fastened by a deformation connection, a second cap can advantageously be connected to the cylinder by means of a weld. This second cap can preferably include any connection for connecting additional components to the rotary actuator. To preferably enable the end surface of the rotary actuator to be used for providing the hydraulic connections, in at least one embodiment of the present invention, it can be desirable that the weld seam is disposed circumferentially about the exterior of the cylinder. Thus, the weld see would essentially not interfere with any connections, which, if the weld seam was on the end surface, could possibly require that the actuator have a greater diameter to accommodate both the weld seam and the hydraulic connections.

In assembling the actuator, it can be preferable that the second cap is attached to the cylinder first. Then, because the first cap can be attached to the cylinder by a deformation connection, after attaching the second cap, it can be advantageous to test the weld seam on the second cap for leaks. If the weld seam is found to leak, the weld seam can preferably be easily repaired, since other components of the actuator would not yet have been installed. If the weld leaks and cannot be repaired, only the cylinder would need to be scrapped, as no other components would have yet been attached thereto. In known embodiments when both caps were welded on, it would of course also be possible to check the cylinder with the caps for leaks, but this process could only be performed on a single cap. In essence, there would apparently be no need to perform a leak test on the second cap, since it would be very difficult to repair this second weld seam on the fully-assembled rotary actuator without damage to the internal parts of the rotary actuator.

One essential feature which reduces the amount of space required for installation of a rotary actuator is that the connection system can essentially be formed by at least two ring channels which are formed by an overlap between one end cap and a ring wall of the cylinder. Each ring channel can preferably be connected to its corresponding work cheers by means of at least one connecting passage within the cylinder. For providing such ring channels, at least two encircling grooves can be introduced into the cap, about the exterior periphery of the cap, in the vicinity of the overlap of the cap with the cylinder.

The connection system can preferably be located in the end cap which is crimped-onto the cylinder by the deformation connection, and the hydraulic connections can preferably be located in the welded-on cap. The connection system with its seals can thereby be at a maximum distance from the weld seam, so that it is even possible to use welding methods which generate extreme amounts of heft such as the MAG method (MIG metal-argon-gas). Since the welding takes place remote from the seals, a further advantage of the present invention can be seen in that the seals can preferably be installed with a lubricant, so that the conventionally evaporating lubricants cannot have any negative influence on the weld seam.

The invention will be described further hereinbelow with reference to the accompanying figures. It should be understood that when the word "invention" is used in this application, the word "invention" includes "inventions" that is the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a rotary actuator comprising: housing apparatus; apparatus for connecting the housing apparatus to a first portion of a motor vehicle suspension; shaft apparatus, the shaft apparatus defining a longitudinal axis; at least a portion of the shaft apparatus being rotdrably disposed within the housing apparatus; apparatus for connecting the shaft apparatus to a second portion of a motor vehicle suspension; apparatus for rotdrably mounting the at least a portion of the shaft apparatus within the housing apparatus for rotation of at least one of the shaft apparatus and the housing apparatus about the longitudinal axis with respect to the other of the shaft apparatus and the housing apparatus; the shaft apparatus comprising an outer surface disposed towards the housing apparatus; the housing apparatus comprising an inner surface disposed towards the outer surface of the shaft apparatus, the inner surface of the housing apparatus being spaced apart from the outer surface of the shaft apparatus to define a chamber between the shaft apparatus and the housing apparatus, the chamber having a first axial end and a second axial end; cap apparatus for closing at least one of the first and second axial ends of the chamber; apparatus for connecting the cap apparatus to the housing apparatus; the rotary actuator having an axial dimension along the longitudinal axis and a radial dimension radial to the longitudinal axis; the connected housing apparatus and cap apparatus defining the axial and radial dimensions; and the apparatus for connecting being configured for minimizing the axial and radial dimensions of the rotary actuator.

Another aspect of the invention resides broadly in a method for assembling a rotary actuator, the rotary actuator comprising: housing apparatus; apparatus for connecting the housing apparatus to a first portion of a motor or vehicle suspension; shaft apparatus, the shaft apparatus defining a longitudinal axis; at least a portion of the shaft apparatus being rotatably disposed within the housing apparatus; apparatus for connecting the shaft apparatus to a second portion of a motor vehicle suspension; apparatus for rotatably mounting the at least a portion of the shaft apparatus within the housing apparatus for rotation of at least one of the shaft apparatus and the housing apparatus about the longitudinal axis with respect to the other of the shaft apparatus and the housing apparatus; the shaft apparatus comprising an outer surface disposed towards the housing apparatus; the housing apparatus comprising an inner surface disposed towards the outer surface of the shaft apparatus, the inner surface of the housing apparatus being spaced apart from the outer surface of the shaft apparatus to define a chamber between the shaft apparatus and the housing apparatus, the housing apparatus having a first axial end and a second axial end; first and second cap apparatus for respectively closing each of the first and second axial ends of the chamber; the method comprising the steps of: providing the housing apparatus;

providing the second cap apparatus; welding the second cap apparatus to the second axial end of the housing apparatus; providing the shaft apparatus; disposing the shaft apparatus at least partially within the housing apparatus through the first axial end of the housing apparatus; disposing the first cap apparatus about the shaft apparatus and within the inner surface of the housing apparatus; and radially inwardly deforming at least a portion of the first axial end of the housing apparatus to engage at least a portion of the first cap apparatus, to retain the first cap apparatus within the housing apparatus.

BRIEF DESCRIPTION OF THE DRAWINGS

The invention and its advantages are explained in greater detail below with reference to the embodiments illustrated in the accompanying figures, in which.

DESCRIPTION OF THE PREFERRED EMBODIMENTS

Figure 1:
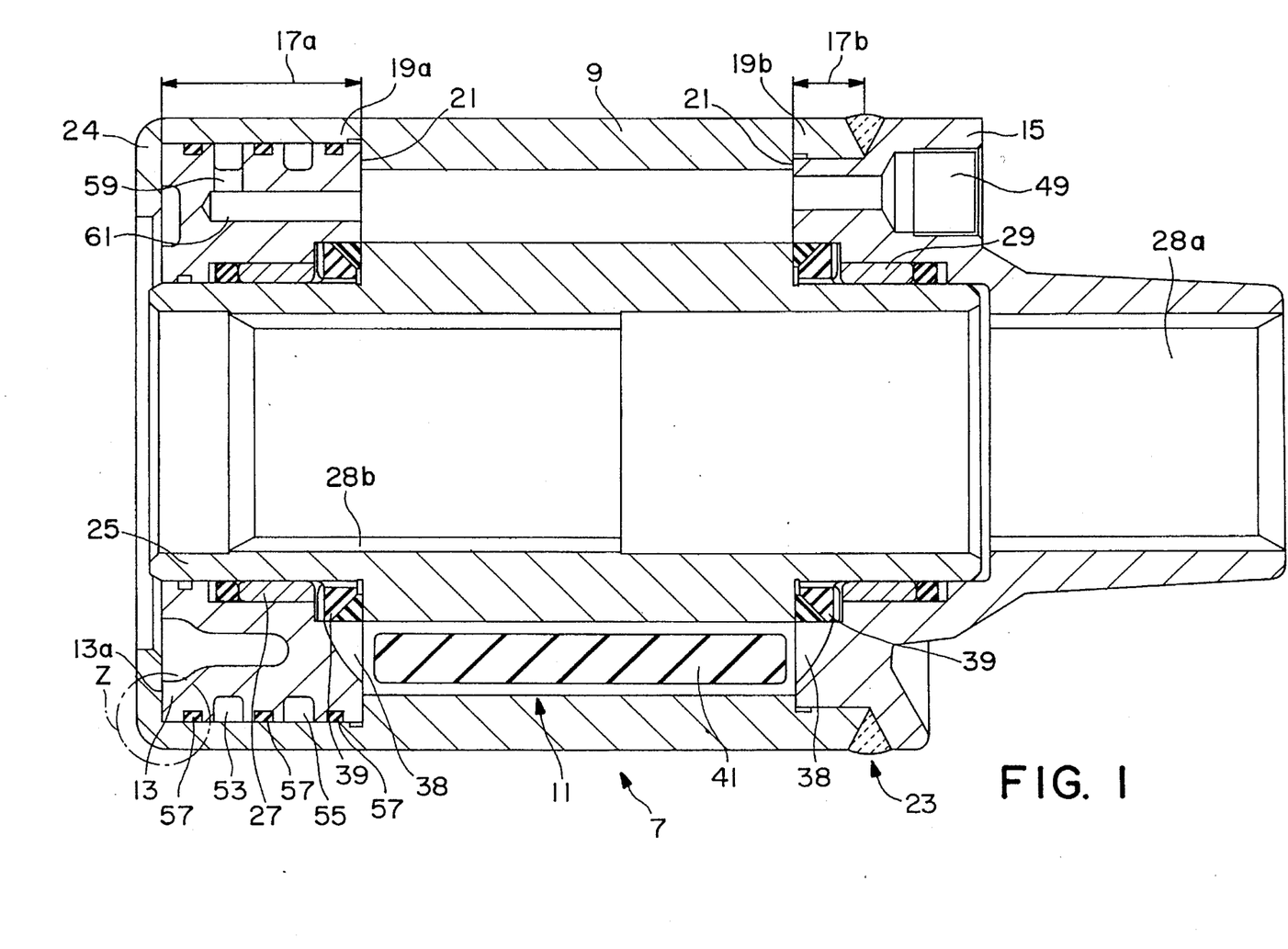
FIG. 1 shows a rotary actuator in longitudinal section.

FIG. 1 shows a rotary actuator 7, e.g. as it might be used in an adjustable stabilizer to control the rolling action. A further description of the rotary actuator in conjunction with the connections of the rotary actuator to the stabilizer system of a motor vehicle will be discussed further herebelow.

The rotary actuator 7 preferably has, among other things, a housing, which can be in the form of a cylinder 9. The cylinder 9 can define an inside surface, on the inside diameter of which there can preferably be ribs 11 which preferably run in an axial direction of the cylinder. The ribs 11 and the cylinder 9 can preferably be made in one piece, but two piece units could also be provided wherein the ribs 11 are separate components from the cylinder 9. On both ends of the cylinder 9, a cap or cover 13 and a cap or cover 15 can preferably be provided to essentially define, in conjunction with the cylinder 9, a working space. The caps 13 and 15 can preferably have an overlap 17a/17b with respective ring walls 19a/19b of the cylinder 9. The positioning of the caps 13 and 15 inside the cylinder 9 can preferably be accomplished by means of end surfaces 21 of the ribs 11.

Figure 3:
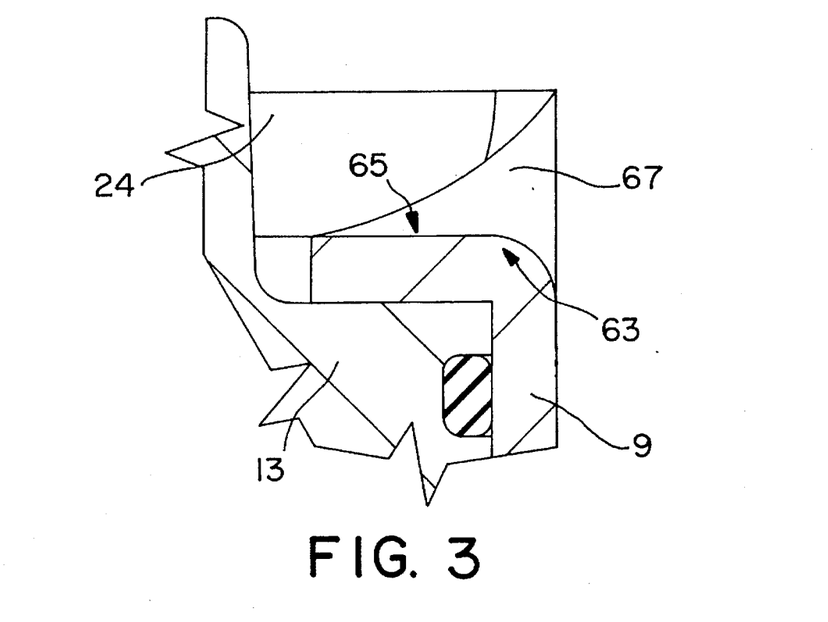
FIGS. 3 and 4 depict embodiments of deformation connections.
Figure 4:
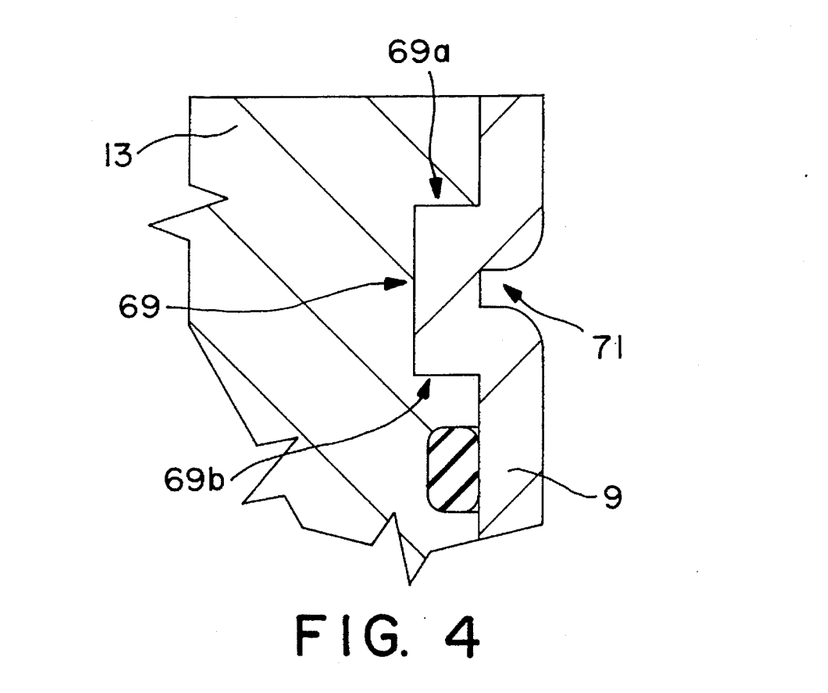

As shown in FIG. 1, the cap 15 can be connected to the cylinder 9 by means of a weld seam 23. This weld seam 23 can preferably be located circumferentially about an exterior surface of the rotary actuator to thereby leave the entire end surface free for use in making hydraulic connections to the cylinder 9. For this circumferential weld seam 23, the overlap 17b should preferably be as short as possible, to keep to a minimum the theoretical lever arm for a radially-acting pressure force in the working space. This radial acting pressure force in the working space, together with the pressure force on the weld seam 23 can exert a bending moment. The other cap 13 can preferably be fixed in place inside the rotary actuator 7 by means of a deformation connection, such as by means of a crimped flange 24 shown in FIG. 1, or the alternative deformation connections as depicted by FIGS. 3 and 4.

Inside the working space there can preferably be a motor shaft 25 with a connection 28b preferably in the form of an internal contour, so that a rotating component can be connected to the rotary actuator 7. This connection 28b could preferably be a toothed connection, or any other type of non-round connection which can rotatably engage another member therein. The motor shaft 25, which can be rotationally mounted by means of friction bearings 27, 29, can preferably have on its outside diameter a number of vanes 31 (see FIG. 2) which can have essentially the same axial orientation as the ribs 11 of the cylinder 9. Like the ribs 11, the vanes 31 can be integral components with the shaft 25, or can be separate components disposed in conjunction with the shaft 25.

Figure 2:
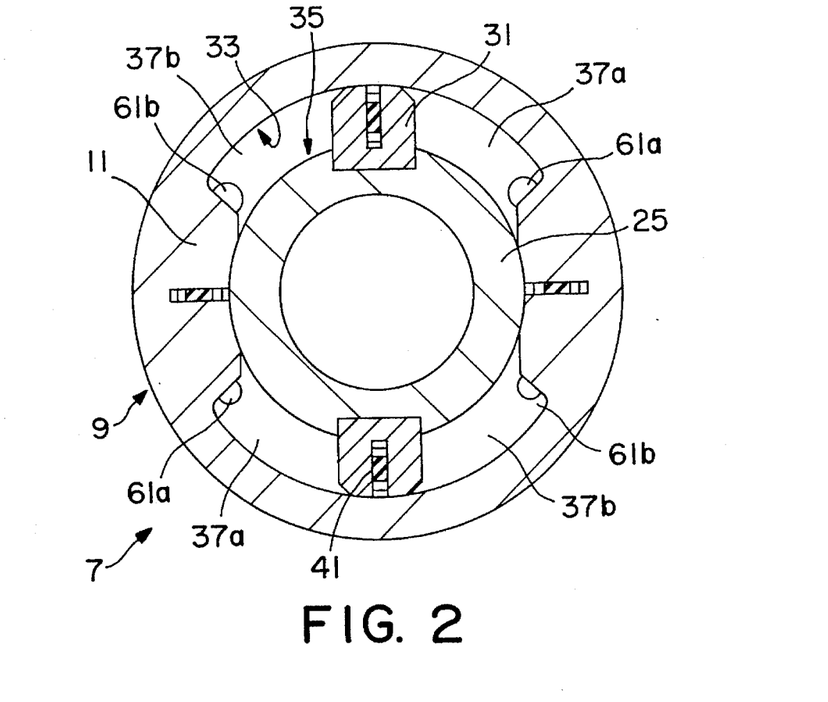
FIG. 2 shows a cross section through a rotary actuator with a ring channel connection system.

The following description essentially also applies to FIG. 2. The ribs 11 and the inside wall surface 33 of the cylinder 9, as well as the vanes 31 and the outside shell 35 of the motor shaft 25, can form work chambers 37a 37b. The work chambers 37a, 37b can preferably be sealed on one hand by means of axial, or angle seal rings 39 (see FIG. 1), in the vicinity of the bases of the vanes 31 between the caps 13, 15 and the vanes 31. These angle seal rings 39 can preferably be in contact with a small passage 38 in the caps 13, 15, so that any hydraulic pressure which might build up behind the seals 39 can be dissipated. The small passages 38 must essentially always be positioned in the vicinity of the end surfaces of the vanes 31 and of the ribs 11, which vanes 31 and ribs 11 can be sealed by means of seals 41, so that neighboring work chambers 37a, 37b are essentially hydraulically separated from one another.

The cap 15 can preferably be provided with two hydraulic connections for providing hydraulic fluid into the work chambers 37a, 37b, of which only hydraulic connection 49 is shown for reasons of simplicity. A second hydraulic connection could essentially be identical to the connection 49, but would lead into a different one of the cheers 37a, 37b. Both of the hydraulic connections 49 can preferably be oriented parallel to the principal axis of the rotary actuator 7. The hydraulic connections 49 are preferably deliberately provided in the welded-on cap 15, since on this cap 15, the hydraulic connections 49 can generally always be stationary relative to a connection 28a for a neighboring component, e.g. a stabilizer. Each of the two hydraulic connections 49 can be directly connected to different ones of the work chambers 37a, 37b. In addition, by means of a connection system, there can be a connection between once of the work chambers 37a, 37b having the same indexing. The work chambers 37a connected to one another, and corresponding to a first hydraulic connection 49, can alternate with the work chambers 37b, corresponding to a second hydraulic connection 49.

Figure 2A:
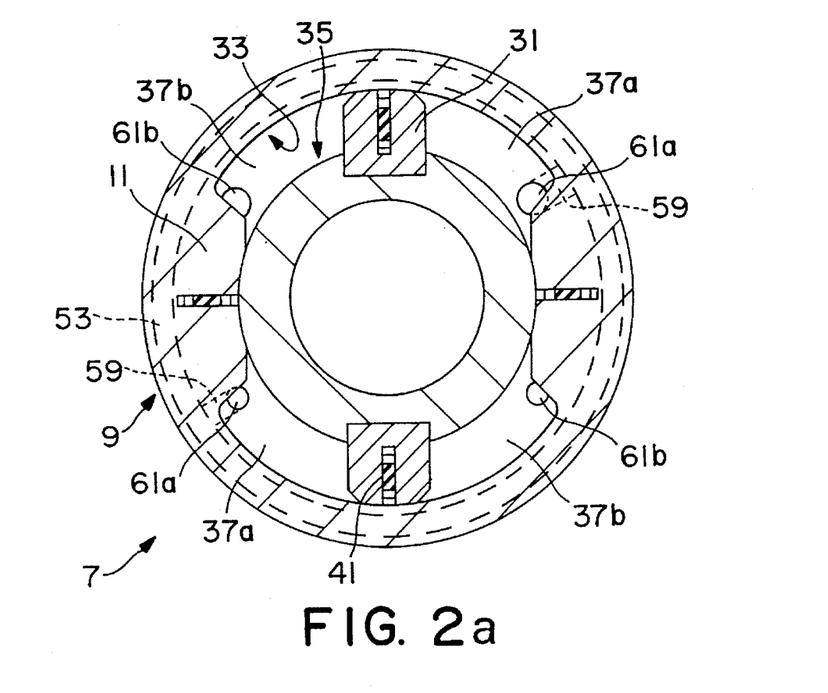
FIG. 2a shows a cross section through a rotary actuator with the ring channel connections for one paired set of chambers.

In the area of overlap 17a of the cover 13, ring channels 53 and 55 can preferably be provided. A further depiction of the ring channel 53 is shown in FIG. 2a, wherein the ring channel is depicted in outline in a cross-sectional view of the actuator 7. These ring channels 53, 55 can preferably be separated from one another by means of ring seals 57. Each ring channel 53, 55 can preferably, on the one hand, be formed by grooves in the cover 13 and the inner wall of the ring wall 19a of the cylinder 9. These ring channels 53, 55 can each have a radial passage 59 connected to axial passages 61a, 61b. The axial passages 61a, 61b can each be provided in the form of blind holes. The axial passages 61a, 61b, preferably connect the work chambers 37a, 37b, by means of the radial passages 59, with the ring channels 53 and 55. FIG. 1 shows axial passage 61 connected by radial passage 59 to ring channel 53.

During the assembly of the rotary actuator 7, a prepared cylinder 7 can be thoroughly cleaned and welded to the cover 15, preferably in a welding jig (not shown as such are generally well known), whereby for reasons of cost the MAG welding process can be the most appropriate. It is thereby also possible to preferably supply the cover 15 as a prefabricated part. After welding the cap 15 to the cylinder 9 by means of the weld seam 23, the weld seam 23 can be tested for leaks and repaired if necessary. Then, the bearing 29 with the seal 39 can be inserted into the cover 15. At this juncture, the flat seals 41 could also be inserted into the ribs 11, while the seals 41 could also possibly be inserted after insertion of the motor shaft 25. Then the motor shaft 25, which can be equipped with seals 41, can be introduced into the cylinder 9, until the motor shaft 25 comes into contact with the seal 39. In an additional process step, the cover 13 and the bearing 27 and seal 39, as well as the ring seals 57, can be introduced into the cylinder 9 until the cover 13 comes into contact with the end surface 21.

Then follows the preparation of the deformation connection, preferably by crimping of the flange 24 on the cap 13. During this process, care must be taken that the two covers 13, 15 are properly aligned, on account of the small passages 38, as discussed above, so that the passages 38 are disposed in alignment with preferably the end surfaces of either the ribs 11 or the vanes 31.

The operation of such a rotary actuator 7 can essentially be quite simple. By means of one of the two hydraulic connections 49, hydraulic medium can be introduced at an overpressure into the rotary actuator 7. By means of one of the axial passages, i.e., 61a, and from there via the radial passages 59, the medium in the ring channel 53 can be transported into the respective work chambers, i.e., chambers 37a. The pressure force inside the connected work chambers 37a filled with high pressure hydraulic medium, can produce a relative rotational movement between the motor shaft 25 and the cylinder 9. The hydraulic medium from the work chambers 37b, not supplied with hydraulic medium, can thereby be displaced, by the relative movement between the ribs 11 and vanes 31, via the axial passages 61b, radial passages 59 and the other hydraulic connection 49, out of the chambers 37b and into a reservoir (not shown).

FIG. 3, which depicts another possible type of deformation connection for connecting an end cap 13, is essentially an enlarged detail of the area (Z) circled in FIG. 1. Instead of the crimped, or rolled flange 24, which can essentially completely encircle the end cap 13, the deformation connection as depicted by FIG. 3 can essentially be formed by at least one partial bead 63. It might, for example be preferable that three partial beads 63 be disposed about the periphery of the end cap 13 at approximately 120 degrees with respect to one another. Alternatively, there could be four partial beads disposed at about 90 degrees with respect to one another, five partial beads 63 at about 72 degrees, etc., such that the partial beads were spaced about the periphery in a manner which was sufficient to retain the end cap 13 within the cylinder 9.

Closing surfaces 65 can preferably be formed by radially deforming essentially only portions of flange 24 so that surfaces 65 are disposed essentially radially, or axially adjacent end cap 13. As such, the surfaces 65 can essentially be connected by transitions sections 67 to the remaining flange 24, wherein the transition sections 67 preferably provide a transition between the radial surfaces 65 and the axial flange portions 24. A fabrication process required for such a deformation could essentially be very simple, and could preferably employ a stamping tool or beading die (not shown) which is pushed from radially outward into the flange 24 to deform the flange 24 radially inwardly. In effect, the width of the stamping tool can define the width of the closing surfaces 65.

In a further embodiment of the present invention, as an alternative to a deformation of the flange 24 at the end of the cylinder 9, at least one deformation could be provided essentially radially about the cylinder 9 as shown in FIG. 4. As shown in FIG. 4, the cap 13 can essentially have at least one groove 69 disposed circumferentially thereabout a distance from the end surface 13a thereof. This groove 69 can preferably be used to locate a bead 71, on the interior of cylinder 9. This bead 71/groove 69 interlock can preferably transmit the necessary retaining forces by means of the sides 69a/b of the groove. With this embodiment, the cylinder 9 can be closed smoothly (flush) with the end surface 13a of cap 13, so that there is no projecting flange. Depending on the model, or mode of realization, the groove 69 or the bead 71 can be partial grooves 69 and beads 71, in a manner similar to that discussed above with regard to surfaces 65, or the groove 69 and beads 71 can also completely encircle the cylinder.

In forming the embodiment as shown in FIG. 4, the beads 71 could essentially be punched into the grooves 69 after insertion of the end cap 13 into the cylinder 9. Such a punching operation could be performed by a radially inwardly moving tool, similar to that as discussed above with regard to the surfaces 65.

Figure 5:
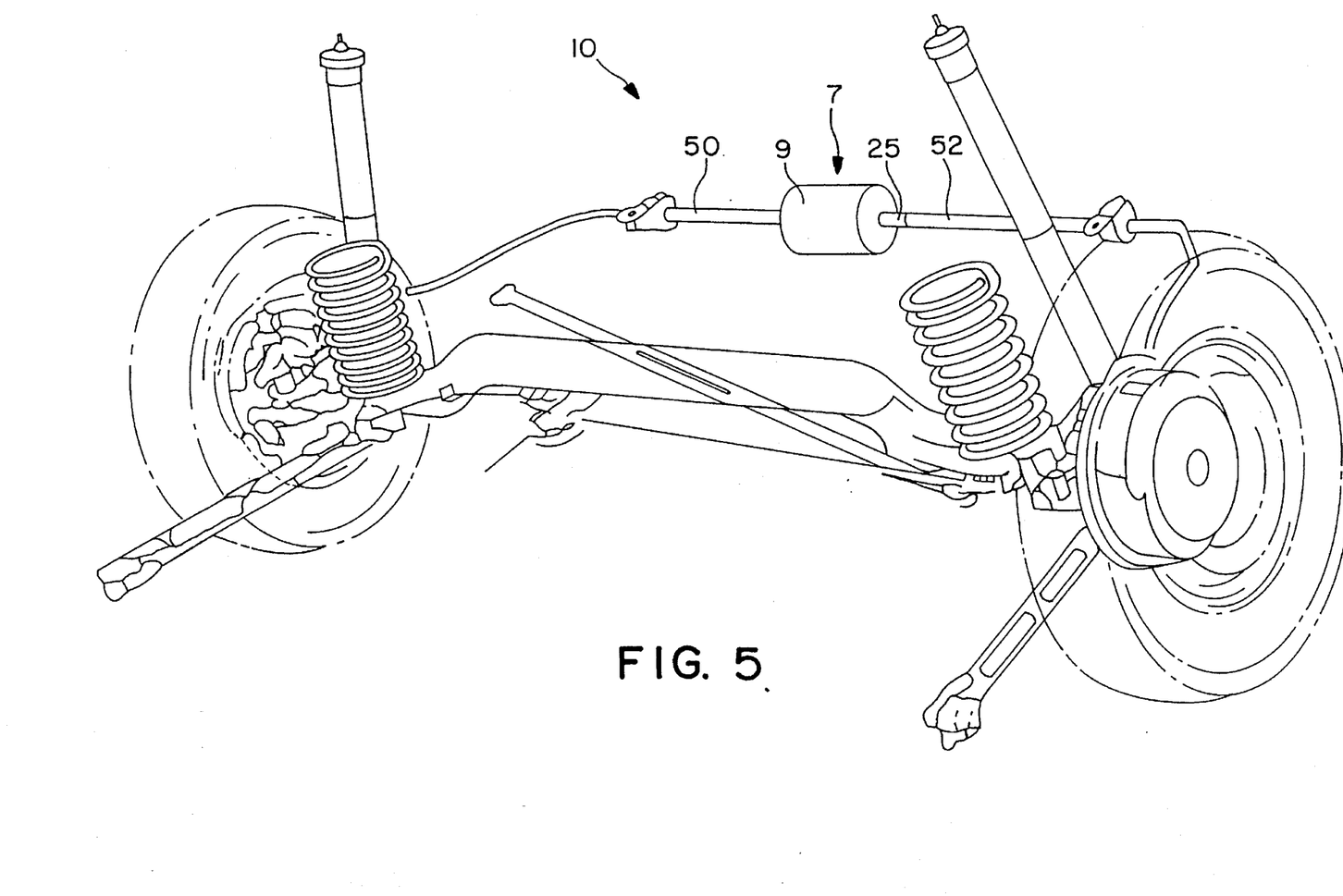
FIGS. 5 and 6 further detail a rotary actuator stabilizer system for a motor vehicle.

FIG. 5 shows the positioning of a rotary actuator 7 in accordance with the present invention as a part of a stabilizer system 10 of an automobile suspension. The rotary actuator 7 can preferably be attached via cylinder 9 to one stabilizer bar 50, and via shaft 25 to another stabilizer bar 52.

Figure 6:
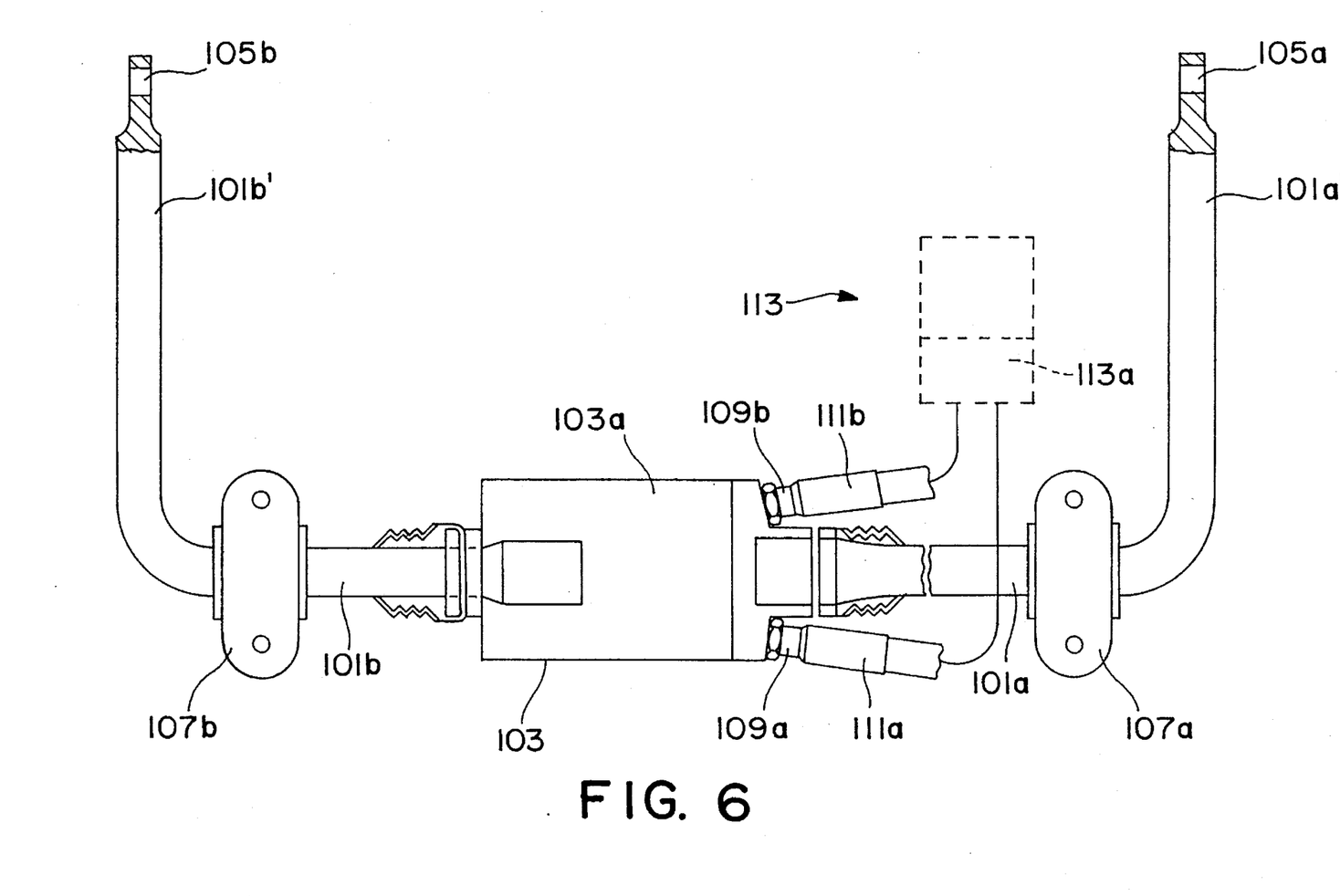

A more detailed view of the use of a rotary actuator in a motor vehicle suspension, as shown in FIG. 5, is provided in FIG. 6 which represents a stabilizer 101a, 101b with a rotary actuator 103. On the angled ends 101a, 101b' there are preferably locators 105a, 105b in which the wheel bearings are engaged, which wheel bearings are not shown in the figure for purposes of simplicity. The stabilizer 101a, 101b is preferably fastened to the vehicle by means of articulated clips 107a, 107b.

The rotary actuator 103 essentially includes a rotary actuator housing 103a and a rotary actuator vane assembly, which vane assembly is not shown in the figure, whereby the rotary actuator housing 103a is preferably non-rotationally connected to the stabilizer part 101a, and the rotary actuator vane assembly is preferably non-rotationally connected to the stabilizer part 101b. In the event of uneven deflection of the vehicle springs, the rotary actuator 103 can be rotated by means of the angled ends 101a', 101b', whereby wheel contact forces interact with the angled ends 101a', 101b' to exert a torsional moment on the stabilizer.

The rotary actuator 103 preferably has two hydraulic connections 109a, 109b which preferably form a connection to a hydraulic system 113 via the hydraulic lines 111a, 111b, whereby the hydraulic system preferably includes a hydraulic valve 113a, among other things. The components of the hydraulic system 113 can be permanently installed in the vehicle so that with each deflection of the vehicle springs or stabilizer movement, there can be a relative movement of the hydraulic lines 111a, 111b with respect to the hydraulic system 113, which movement should preferably be compensated for by the hydraulic hoses 111a, 111b together with the hydraulic connections 109a, 109b.

one feature of the invention resides broadly in the rotary actuator, in particular for a divided stabilizer on a vehicle axle, comprising a cylinder, the ends of which are closed and which forms a working space, ribs which run axially on the inside diameter of the cylinder, a motor shaft with vanes which have the same axial extension as the ribs of the cylinder, whereby the vanes of the motor shaft and the ribs of the cylinder divide the working space into individual work chambers, a first and a second hydraulic connection for two separate work chambers, a connection system between the work chambers which forms a hydraulic connection between at least pairs of work chambers, whereby the orientation of the connected work chambers is such that the work chambers corresponding to the first hydraulic connection alternate with those which are connected to the second hydraulic connection, characterized by the fact that a first cap 13 which closes the end of the working space is fixed in place on the rotary actuator 7 by means of a deformation connection.

Another feature of the invention resides broadly in the rotary actuator characterized by the fact that the deformation connection is realized by means of a crimped flange 24 of the cylinder 9.

A further feature of the invention resides broadly in the rotary actuator characterized by the fact that the deformation connection is formed by at least one partial bead 69.

A still further feature of the invention resides broadly in the rotary actuator characterized by the fact that the deformation connection is realized by at least one bead 71.

Another feature of the invention resides broadly in the rotary actuator characterized by the fact that a second cover is connected to the cylinder 9 by means of a weld 23, whereby the second cap 15 has a connection 28a for an additional component.

Yet another feature of the invention resides broadly in the rotary actuator characterized by the fact that the connection system consists of at least two ring channels 53, 55 which are formed by an overlap 17a of a cap and a ring wall 19a of the cylinder 9, whereby on one hand, each ring channel 53, 55 is connected to the corresponding work chamber by means of at least one passage 59, 61a, 61b.

Still another feature of the invention resides broadly in the rotary actuator characterized by the fact that in the cover, in the vicinity of the overlap 17a with the cylinder 9, at least two encircling grooves are introduced which form the ring channels 53, A further feature of the invention resides broadly in the rotary actuator characterized by the fact that the connection system 53, 55, 59, 61 is located in the crimped-on cap 13, and the hydraulic connections 49, 51 are located in the welded-on cap 15.

Some types of automobile suspension systems that would be utilized in accordance with the rotary actuator motor may be or are disclosed by the following U.S. Pat. No. 5,178,406 to Reynolds, entitled "Torsion Bar Suspension"; U.S. Pat. No. 5,286,059 to Tabs, entitled "Height Control System when Vehicle Is Jacked up"; U.S. Pat. No. 5,288,101 to Minnett, entitled "Variable Rate Torsion Control System for Vehicle Suspension"; and U.S. Pat. No. 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Pat. No. 5,332,236 to Kastuhara et al., entitled "Sealing Mechanism for a Rotary Actuator"; U.S. Pat. No. 5,309,816 to Weyer, entitled "Rotary Actuator with External Bearings"; U.S. Pat. No. 5,267,504 to Weyer, entitled "Rotary Actuator with Annular Fluid Coupling Rotatably Mounted to Shaft"; and U.S. Pat. No. 5,310,021 to Hightower, entitled "Motor-driven, Spring-returned Rotary Actuator".

The seals 39 utilized by a rotary actuator can preferably be elastic or resilient, and the seals can also preferably be elastomeric and/or polymeric. Some types of seals that could be utilized with the present invention may be or are disclosed by the following U.S. Pat. No. 5,321,964 to Lovell etal. entitled "External Seal Device for Tube Hydroforming"; U.S. Pat. No. 5,250,607 to Comert et al., entitled "Moisture Cured Elastomeric Interpenetrating Network Sealants"; U.S. Pat. No. 5,259,737 to Kamisuki et al., entitled "Micropump with Valve Structure"; U.S. Pat. No. 5,234,194 to Smith, entitled "Seal for a Shaft"; and U.S. Pat. No. 5,190,299 to Johnston, entitled "Radially Undulating Shaft Seal".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A rotary actuator comprising:

housing means;

means for connecting said housing means to a first portion of a motor vehicle suspension;

shaft means, said shaft means defining a longitudinal axis;

at least a portion of said shaft means being rotatably disposed within said housing means;

means for connecting said shaft means to a second portion of a motor vehicle suspension;

means for rotatably mounting said at least a portion of said shaft means within said housing means for rotation of at least one of said shaft means and said housing means about said longitudinal axis with respect to the other of said shaft means and said housinq means;

said shaft means comprising an outer surface disposed towards said housing means;

said housing means comprising an inner surface disposed towards said outer surface of said shaft means, said inner surface of said housing means being spaced apart from said outer surface of said shaft means to define a chamber between said shaft means and said housing means, said chamber having a first axial end and a second axial end;

cap means for closing at least one of said first and second axial ends of said chamber;

means for connecting said cap means to said housing means;

said means for connecting comprising at least one radial deformation of said housing means;

said at least one radial deformation of said housing means being configured for engaging at least a portion of said cap means;

said housing means having a first axial end and a second axial end;

said cap means fitting within said inner surface of said housing means adjacent at least one of said first and second axial ends of said housing means;

said radial deformation comprising a radially inward deformation of said housing means for engaging at least a portion of said cap means;

said cap means comprising:
- a first axial end surface being disposed within said housing;
- a second axial end surface being opposite said first axial end surface; and
- a cylindrical outer surface extending axially between said first and second axial end surfaces;

said radially inward deformation of said housing means engaging at least one of:
- at least a portion of said second axial end surface of said cap means; and
- at least a portion of said cylindrical outer surface of said cap means;

said housing means comprising a cylindrical flange forming said first end of said housing means;

said radially inward deformation comprising a radially inward deformation of at least a portion of said flange to axially engage said at least a portion of said flange with said at least a portion of said second axial end surface of said cap means;

said cap means comprising first and second cap means for closing both of said first and second axial ends of said chamber;

said means for connecting said first cap means to said housing means comprising said radially inward deformation;

said means for connecting said second cap means to said housing comprising a weld;

said second cap means comprising said means for connecting said housing means to said first portion of a motor vehicle suspension;

each of said outer surface of said shaft means, and said inner surface of said housing means, comprising at least two protections extending towards the other of:
- said outer surface of said shaft means, and
- said inner surface of said housing means;

said projections of said shaft means being disposed between said projections of said housing means;

each of said projections extending from said first axial end of said chamber to said second axial end of said chamber to axially divide said chamber into at least four chamber portions;

means for fluidly connecting together at least a first two of said chamber portions;

means for fluidly connecting together at least a second two of said chamber portions;

each of said at least a first two chamber portions being disposed between ones of said at least a second two chamber portions;

each of said at least a second two chamber portions being disposed between ones of said at least a first two chamber portions;

means for independently introducing fluid into each of:
- said at least a first two chamber portions, and
- said at least a second two chamber portions,
- to relatively rotate said housing means and said shaft means with respect to one another;

said means for fluidly connecting together said at least a first two of said chamber portions comprising at least a first channel disposed circumferentially about said outer cylindrical surface of said first cap means between said first cap means and said inner surface of said housing means;

said means for fluidly connecting together said at least a second two of said chamber portions comprising at least a second channel disposed circumferentially about said outer cylindrical surface of said first cap means between said first cap means and said inner surface of said housing means;

said means for fluidly connecting together said at least a first two of said chamber portions additionally comprising:
- first axial passages in said first cap means in fluid communication with each of said at least a first two of said chamber portions;
- first radial passages in said first cap means extending radially between said first channel and said first axial passages;

said means for fluidly connecting together said at least a second two of said chamber portions additionally comprising:
- second axial passages in said first cap means in fluid communication with each of said at least a second two of said chamber portions; and
- second radial passages in said first cap means extending radially between said second channel and said second axial passages;

said means for introducing fluid comprising hydraulic connections for fluidly connecting said chamber portions to a fluid supply source;

said second cap means comprising said hydraulic connections;

said radially inward deformation comprising a radial inward deformation of all of said flange completely about the circumference of said housing;

said first and second channels being separated from one another axially on said outer cylindrical surface of said first cap means;

said cap means further comprising:
- a third channel being disposed between said first channel and said first end surface of said cap means, said third channel being disposed circumferentially about said outer cylindrical, surface of said first cap means, and said third channel comprising a ring-shaped seal disposed therein to seal said outer cylindrical surface of said first cap means to said inner surface of said housing means;
- a fourth channel being disposed between said first channel and said second channel, said fourth channel being disposed circumferentially about said outer cylindrical surface of said first cap means, and said fourth channel comprising a ring-shaped seal disposed therein to seal said outer cylindrical surface of said first cap means to said inner surface of said housing means; and a fifth channel being disposed between said second channel and said second end surface of said first cap means, said fifth channel being disposed circumferentially about said outer cylindrical surface of said first cap means, and said fifth channel comprising a ring-shaped seal disposed therein to seal said outer cylindrical surface of said first cap means to said inner surface of said housing means;

each of said projections comprising:

a first side being disposed towards one of said first two chamber portions;

a second side being disposed opposite to said first side and adjacent one of said second two chamber portions;

a surface being disposed between said first side and said second side, said surface being disposed towards the other of:
said outer surface of said shaft means, and
said inner surface of said housing means; and
at least one seal means for sealing said surface of said at least one projection to the other of:
said outer surface of said shaft means, and
said inner surface of said housing means,
to minimize fluid flow from said first two chamber portions to said second two chamber portions;

said first and second cap means comprising gasket means for sealing said cap means about said shaft means;

said cap means further comprising bearing means for rotatably mounting said shaft means within said cap means;

said shaft means comprising a longitudinal hole therein disposed along said longitudinal axis of said shaft means;

at least a portion of said longitudinal hole having a non-round cross section;

said means for connecting said shaft means to a second portion of a motor vehicle suspension comprising said non-round cross-section of said longitudinal hole;

said housing comprising a cylinder, said cylinder having an outer surface; and said weld of said second cap means being disposed circumferentially about said outer surface of said cylinder at said second axial end of said cylinder.

2. A rotary actuator comprising:

housing means;

means for connecting said housing means to a first portion of a motor vehicle suspension;

shaft means, said shaft means defining a lonqitudinal axis;

at least a portion of said shaft means being rotatably disposed within said housing means;

means for connecting said shaft means to a second portion of a motor vehicle suspension;

means for rotatably mounting said at least a portion of said shaft means within said housing means for rotation of at least one of said shaft means and said housing means about said longitudinal axis with respect to the other of said shaft means and said housing means;

said shaft means comprising an outer surface disposed towards said housing means;

said housing means comprising an inner surface disposed towards said outer surface of said shaft means, said inner surface of said housing means being spaced apart from said outer surface of said shaft means to define a chamber between said shaft means and said housing means, said chamber having a first axial end and a second axial end;

cap means for closing at least one of said first and second axial ends of said chamber;

means for connecting said cap means to said housing means;

said means for connecting comprising at least one radial deformation of said housing means;

said at least one radial deformation of said housing means being configured for engaging at least a portion of said cap means;

said housing means having a first axial end and a second axial end;

said cap means fitting within said inner surface of said housing means adjacent at least one of said first and second axial ends of said housing means;

said radial deformation comprising a radially inward deformation of said housing means for engaging at least a portion of said cap means; said cap means comprising:

a first axial end surface being disposed within said housing;

a second axial end surface being Opposite said first axial end surface; and a cylindrical outer surface extending axially between said first and second axial end surfaces;

said radially inward deformation of said housing means engaging at least one of:

at least a portion of said second axial end surface of said cap means; and at least a portion of said cylindrical outer surface of said cap means;

said cap means comprising at least a first circumferential groove, portion disposed about said outer cylindrical surface and spaced apart from said first end surface; and said radially inward deformation comprising a radially inward deformation of at least a portion of said housing means into said at least a first circumferential groove portion.

3. The rotary actuator according to claim 2 wherein:

said at least a first circumferential groove portion is disposed completely circumferentially about said outer cylindrical surface of said cap means; and said radially inward deformation comprises a radially inward deformation completely about the circumference of said housing means into said circumferential groove of said cap means.

4. The rotary actuator according to claim 3, wherein:

said cap means comprises first and second cap means for closing both of said first and second axial ends of said chamber;

said means for connecting said first cap means to said housing means comprises said radially inward deformation;

said means for connecting said second cap means to said housing comprises a weld;

said second cap means comprises said means for connecting said housing means to said first portion of a motor vehicle suspension;

each of said outer surface of said shaft means, and said inner surface of said housing means, comprise at least two projections extending towards the other of:
said outer surface of said shaft means, and said inner surface of said housing means;

said projections of said shaft means being disposed between said projections of said housing means;

each of said projections extending from said first axial end of said chamber to said second axial end of said chamber to axially divide said chamber into at least four chamber portions;

means for fluidly connecting together at least a first two of said chamber portions;

means for fluidly connecting together at least a second two of said chamber portions;

each of said at least a first two chamber portions is disposed between ones of said at least a second two chamber portions;

each of said at least a second two chamber portions is disposed between ones of said at least a first two chamber portions;

means for independently introducing fluid into each of:
said at least a first two chamber portions, and
said at least a second two chamber portions, to relatively rotate said housing means and said shaft means;

said means for fluidly connecting together said at least a first two of said chamber portions comprises at least a first channel disposed circumferentially about said outer cylindrical surface of said first cap means between said first cap means and said inner surface of said housing means; and said means for fluidly connecting together said at least a second two of said chamber portions comprises at least a second channel disposed circumferentially about said outer cylindrical surface of said first cap means between said first cap means and said inner surface of said housing means.

5. The rotary actuator according to claim 4, wherein:

said means for fluidly connecting together said at least a first two of said chamber portions additionally comprises:
first axial passages in said first cap means in fluid communication with each of said at least a first two of said chamber portions; and
first radial passages in said first cap means extending radially between said first channel and said first axial passages;

said means for fluidly connecting together said at least a second two of said chamber portions additionally comprises:
second axial passages in said first cap means in fluid communication with each of said at least a second two of said chamber portions; and
second radial passages in said first cap means extending radially between said second channel and said second axial passages; said means for introducing fluid comprises hydraulic connections for fluidly connecting said chamber portions to a fluid supply source;

said second cap means comprises said hydraulic connections;

said first and second channels are separated from one another axially on said outer cylindrical surface of said first cap means;

said cap means further comprises:
a third channel disposed between said first channel and said first end surface of said cap means, said third channel being disposed circumferentially about said outer cylindrical surface of said first cap means, and said third channel comprising a ring-shaped seal disposed therein to seal said outer cylindrical surface of said first cap means to said inner surface of said housing means;
a fourth channel disposed between said first channel and said second channel, said fourth channel being disposed circumferentially about said outer cylindrical surface of said first cap means, and said fourth channel comprising a ring-shaped seal disposed therein to seal said outer cylindrical surface of said first cap means to said inner surface of said housing means; and
a fifth channel disposed between said second channel and said second end surface of said first cap means, said fifth channel being disposed circumferentially about said outer cylindrical surface of said first cap means, and said fifth channel comprising a ring-shaped seal disposed therein to seal said outer cylindrical surface of said first cap means to said inner surface of said housing means; each of said projections comprises:
a first side disposed towards one of said first two chamber portions;
a second side disposed opposite to said first side and adjacent one of said second two chamber portions;
a surface disposed between said first side and said second side, said surface being disposed towards the other of:
said outer surface of said shaft means, and
said inner surface of said housing means; and
at least one seal means for sealing said surface of said at least one projection to the other of:
said outer surface of said shaft means, and
said inner surface of said housing means,
to minimize fluid flow from said first two chamber portions to said second two chamber portion;

said first and second cap means comprise gasket means for sealing said cap means about said shaft means;

said cap means further comprises bearing means for rotatably mounting said shaft means within said cap means;

said shaft means comprises a longitudinal hole therein disposed along said longitudinal axis of said shaft means;

at least a portion of said longitudinal hole having a non-round cross section;

said means for connecting said shaft means to a second portion of a motor vehicle suspension comprises said non-round cross-section of said longitudinal hole;

said housing comprises a cylinder, said cylinder having an outer surface; and said weld of said second cap means is disposed circumferentially about said outer surface of said cylinder at said second axial end of said cylinder.

6. A method for assembling a rotary actuator, the rotary actuator comprising: housing means; means for connecting said housing means to a first portion of a motor vehicle suspension; shaft means, said shaft means defining a longitudinal axis; at least a portion of said shaft means being rotatably disposed within said housing means; means for connecting said shaft means to a second portion of a motor vehicle suspension; means for rotatably mounting said at least a portion of said shaft means within said housing means for rotation of at least one of said shaft means and said housing means about said longitudinal axis with respect to the other of said shaft means and said housing means; said shaft means comprising an outer surface disposed towards said housing means; said housing means comprising an inner surface disposed towards said outer surface of said shaft means, said inner surface of said housing means being spaced apart from said outer surface of said shaft means to define a chamber between said shaft means and said housing means, said housing means havinq a first axial end portion and a second axial end portion; first and second cap means for respectively closing each of said first and second axial end portions of said chamber;

said method comprising the steps of:
providing said housing means;
providing said second cap means;
fixedly disposing said second cap means at said second axial end portion of said housing means;
providing said shaft means;
disposing said shaft means at least partially within said housing means through said first axial end portion of said housing means;
disposing said first cap means within said first axial end portion, about said shaft means and within said inner surface of said housing means; and
radially inwardly deforming at least a portion of said first axial end portion of said housing means to engage at least a portion of said first cap means, to retain said first cap means within said housing means;

said first axial end portion having a terminal edge and an area adjacent said terminal edge, said terminal edge defining a periphery of said housing means about said shaft means;

said step of radially inwardly deforming comprising at least one of:
radially inwardly deforming said terminal edge of said first axial end portion about the entire periphery of said housing means to engage a substantial portion of said terminal edge with at least a portion of said first cap means;
radially inwardly deforming said terminal edge of said first axial end portion at spaced apart intervals about the periphery of said housing means to engage at least spaced apart portions of said terminal edge with portions of said first cap means; and
radially inwardly deforming at least spaced apart portions of said area adjacent said terminal edge to form at least one radially inwardly protruding bead at a distance from said terminal edge, and engaging the at least one radially inwardly protruding bead with at least one groove of said first cap means;

said fixedly disposing of said second cap means at said second axial end portion comprising welding said second cap means to said second axial end portion, and during said welding forming a weld seam;

said method further comprising the steps of:
after said welding, pressure testing said weld seam for leaks prior to further assembly of said rotary actuator;
configuring each of said inner surface of said housing means and said outer surface of said shaft means to have at least two projections thereon, each of said at least two projections extending in the axial direction of said rotary actuator along said outer surface of said shaft means and said inner surface of said housing means, each of said projections comprising sealing means for sealing said projections to the other of said outer surface of said shaft means and the inner surface of said housing means;
during said inserting of said shaft means into said housing means, dividing said chamber into four spaced apart chamber portions, said four spaced apart chamber portions each being disposed adjacent others of said four chamber portions and opposite one of said four chamber portions, and during said inserting, axially sealing said four chamber portions from the adjacent ones of said four chamber portions;
configuring said first cap means to comprise at least two separate passages for interconnecting said opposite ones of said four chamber portions, each of said passages being configured for connecting one pair of opposite chamber portions; and
inserting said first cap means into said housing to provide said at least two interconnecting passages;

said shaft means having a first end for being disposed adjacent said first axial end portion of said housing and a second end for being inserted into said housing adjacent said second axial end portion of said housing;

said method further comprising the steps of:
disposing at least one sealing element in said second cap means after welding said second cap means to said second axial end portion of said housing means and prior to disposing said shaft means within said housing means to provide a seal about said second end of said shaft means between said second end of said shaft means and said second cap means;
inserting said second end of said shaft means through said seal to seal about said second end of said shaft means between said second end of said shaft means and said second cap means;
inserting at least one additional seal about said first end of said shaft means, prior to disposing said first cap means about said first end of said shaft means to seal between said first end of said shaft means and said first cap means; and
inserting said first cap means about said seal on said first end of said shaft means to seal about said first end of said shaft means between said first end of said shaft means and said first cap means.

7. The method according to claim 6, further comprising:
providing first and second fluid connection means on said first cap means for independently connecting at least one chamber of each pair of oppositely disposed chambers to an external fluid supply;
after said radial deformation, connecting said connection means to a fluid supply, and introducing fluid into said chambers through said connection means from said fluid supply;
providing bearing means about each of said first and second ends of said shaft means between said first and second ends of said shaft means and said first and second cap means;
providing said two passages for interconnecting opposite chamber portions about a circumference of said first cap means, and spaced axially separated from one another, said passages being bordered by said inner surface of said housing means; and
said radially inwardly deforming comprising at least one of:
radially striking said housing means adjacent said first axial end portion from radially outside of said housing means in a radially inward direction to deform said at least a portion of said first axial end portion radially inwardly; and
radially pushing said housing means adjacent said first axial end portion from radially outside of said housing means in a radially inward direction to deform said at least a portion of said first axial end portion radially inwardly.

* * * * *

UNITED STATES PATENT AND TRADEMARK OFFICE
CERTIFICATE OF CORRECTION

Page 1 of 3

PATENT NO. : 5,575,502
DATED : November 19, 1996
INVENTOR(S) : Horst OPPITZ, Stefan SCHIFFLER and Bernhard SCHMITT It is certified that error appears in the above-indentified patent and that said Letters Patent is hereby corrected as shown below:

In column 1, line 18, after 'define', delete "e" and insert --a--.

In column 1, line 64, after 'work', delete "cheers" and insert --chambers--.

In column 2, line 27, after 'work', delete "cheers," and insert --chambers,--.

In column 2, line 47, after 'above.' insert the following heading:
    --SUMMARY OF THE INVENTION--.

In column 3, line 21, after 'weld', delete "see" and insert --seam--.

In column 3, line 50, before 'by', delete "cheers" and insert --chambers--.

In column 3, line 61, after 'of', delete "heft" and insert --heat,--.

In column 4, line 23, before 'mounting', delete "rotdrably" and insert --rotatably--.

In column 4, line 47, after 'motor' delete "or".

In column 6, line 20, after 'chambers', delete "37a37b." and insert --37a, 37b.--.

UNITED STATES PATENT AND TRADEMARK OFFICE
CERTIFICATE OF CORRECTION

PATENT NO. :    5,575,502                                          Page 2 of 3
DATED       :    November 19, 1996
INVENTOR(S) :    Horst OPPITZ, Stefan SCHIFFLER and Bernhard SCHMITT It is certified that error appears in the above-indentified patent and that said Letters Patent is hereby corrected as shown below:

In column 6, line 38, after 'the', delete "cheers" and insert --chambers--.

In column 7, line 64, after 'by', delete "transitions" and insert --transition--.

In column 8, line 40, after 'ends', delete "101a," and insert --101a',--.

In column 9, line 33, after 'cover' insert --15--.

In column 9, line 49, after '53,' insert --55.--.

In column 9, line 60, after 'to', delete "Tabs," and insert --Tabe,--.

In column 11, line 53, Claim 1, after 'two', delete "protections" and insert --projections--.

UNITED STATES PATENT AND TRADEMARK OFFICE
CERTIFICATE OF CORRECTION

PATENT NO. : 5,575,502
DATED : November 19, 1996
INVENTOR(S) : Horst OPPITZ, Stefan SCHIFFLER and Bernhard SCHMITT It is certified that error appears in the above-indentified patent and that said Letters Patent is hereby corrected as shown below:

In column 17, line 2, Claim 6, after the second occurrence of "means", delete "having" and insert --having--.

Signed and Sealed this

Eighteenth Day of March, 1997

Attest:

BRUCE LEHMAN

Attesting Officer

Commissioner of Patents and Trademarks